Feb. 8, 1955     S. T. YANAGISAWA ET AL     2,701,847
COLOR TELEVISION TUBE STRUCTURE

Filed Oct. 2, 1951     3 Sheets—Sheet 1

INVENTORS
SAMUEL T. YANAGISAWA
HENRY F. MISEROCCHI
BY *John C. Dorfman*
ATTORNEY Feb. 8, 1955  S. T. YANAGISAWA ET AL  2,701,847
COLOR TELEVISION TUBE STRUCTURE
Filed Oct. 2, 1951  3 Sheets-Sheet 2

INVENTORS
SAMUEL T. YANAGISAWA
HENRY F. MISEROCCHI
BY John C. Dorfman
ATTORNEY

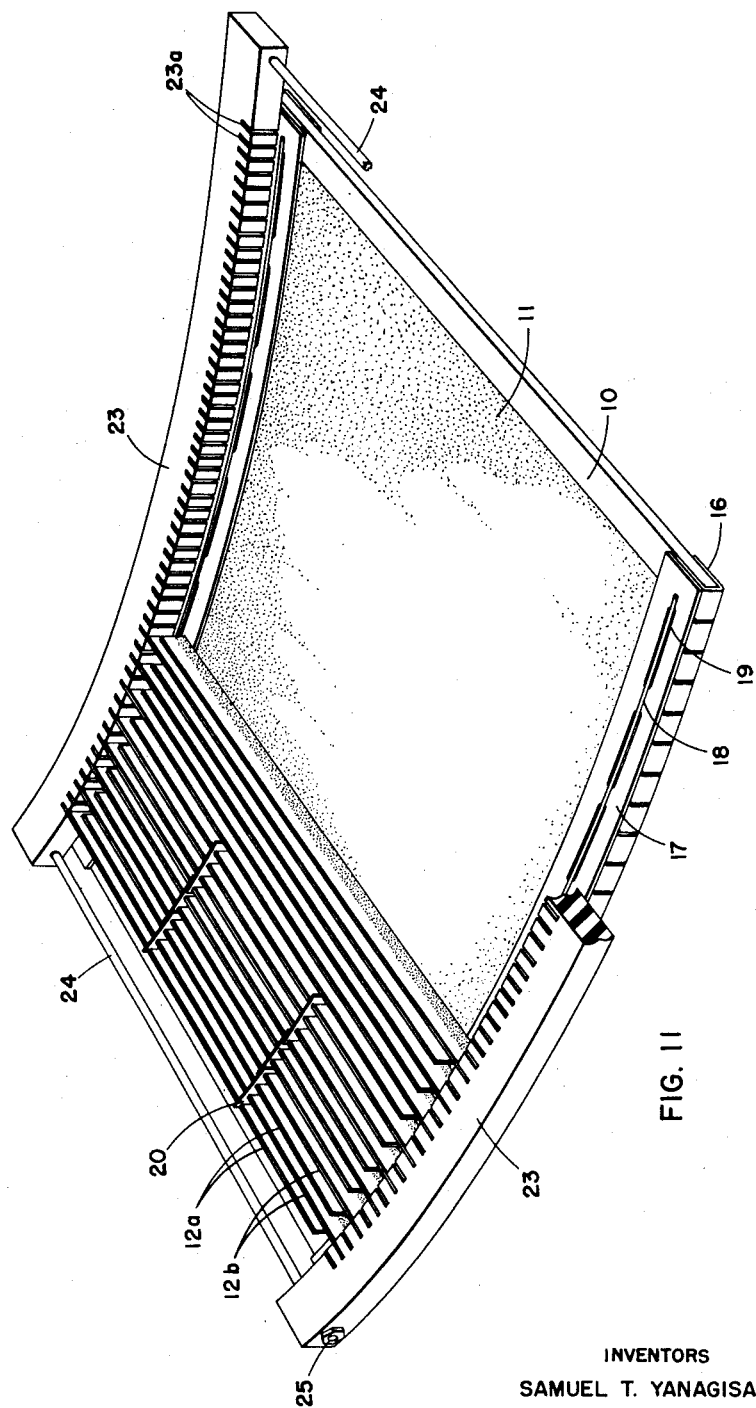

United States Patent Office 2,701,847
Patented Feb. 8, 1955

2,701,847

COLOR TELEVISION TUBE STRUCTURE

Samuel T. Yanagisawa, Springdale, and Henry F. Miserocchi, Old Greenwich, Conn., assignors to Machlett Laboratories, Incorporated, Springdale, Conn., a corporation of Connecticut Application October 2, 1951, Serial No. 249,356

9 Claims. (Cl. 313—72)

This invention concerns a structure for use in a color television receiving tube.

It has been proposed that a color television tube be built using a single electron gun and having color producing elements consisting of a phosphor screen and generally perpendicular thereto a plurality of phosphor coated members. In such a tube, alternate phosphor coated members would bear a phosphor producing a color different from the color produced by the screen and hereafter referred to generally as a second color, when bombarded by electrons. The other phosphor coated members would bear a phosphor producing a third color. These phosphor coated members would be conductive. Members bearing phosphor producing the second color would be electrically connected. Likewise, members bearing phosphor producing the third color would be electrically connected.

In such a tube should the same potential be applied to both sets of phosphor coated members, the region between adjacent members would be field free. Thus, in scanning the screen the electron beam would pass between successive pairs of adjacent phosphor coated members to impinge upon the phosphor coating of the screen, thereby producing a picture in the first color. However, should a higher positive potential be applied to the members bearing the second color, the electron beam would be deflected in passing between adjacent members so that it would impinge upon said second color phosphor, thereby producing a picture in the second color. Similarly, should a higher positive potential be applied to members bearing phosphor of the third color, a picture in the third color would be produced. The translucent coating on the screen would permit pictures of the second and third colors to be seen through the translucent plate. The rate of scanning could be made sufficiently high that successively produced pictures of the three primary colors would be combined by the eye to produce an all-color picture.

Our invention involves a tube of this proposed type wherein the phosphor screen lies on one surface of a plate of translucent material. This plate is preferably an independent member, not part of the tube envelope. The phosphor coated members lying approximately perpendicular to the screen consist of thin conductive strips, preferably of some heat resistant metal. The strips are arranged generally parallel to each other and generally transverse to the plate so that their ends lie adjacent opposite edges of the plate. The strips are supported on members which extend along said opposite edges of the plate. These support members are advantageously mounted on the plate which, due to its rigidity, supplies the mechanical support necessary to hold the strips in front of the screen.

In addition to their support function, these support members are also advantageously made electrically conductive in order to provide a common electrical connection for all the metallic strips bearing phosphor producing the same primary color. Accordingly, each strip is conductively affixed at one end to one of the conductive support members. Its other end is preferably left unattached and is insulated from the conductive strips bearing phosphor of another color. Insulation may be accomplished by terminating the strips short of the support member from which they are insulated. Thus, in order to produce a picture of the second primary color, the proper voltage to deflect the electron beam to the strips bearing the phosphor of the second color may simply be applied to the support member to which said strips are conductively affixed. Similarly, to produce a picture of the third color, the proper deflection voltage may be applied to the member supporting the strips bearing the phosphor of the third color.

Because of the length of the strips relative to their thickness, the preferred practice of affixing them to support members at only one end leaves them free to move laterally and thus to short one to another. The tendency to short or change spacing between strips is overcome in our invention by novel spacing means. These means maintain the correct spacing between strips and, in addition, give added strength and rigidity to the structure.

By using the above construction, it is our object to produce a commercially usable color television tube of the type described which requires the expenditure of a minimum of time and effort in its manufacture. To this end, the structure of our invention lends itself to manufacture using a simple fixture which may be conveniently clamped to the translucent plate. Use of this fixture permits the conductive strips to be quickly, yet accurately, aligned and held in place while being permanently fixed in place to the support members by welding, brazing, etc.

For a better understanding of our invention reference is made to the following drawings.

Figure 4:
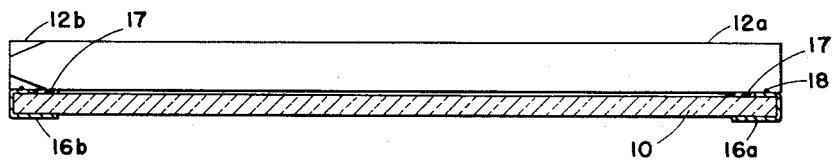
Fig. 4 is a view partially in section illustrating one method of mounting the conductive strips.
Figure 5:
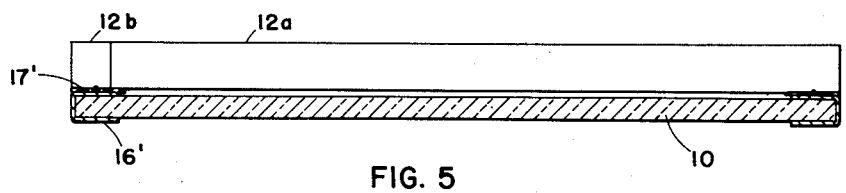

Fig. 5 in a view similar to that of Fig. 4 shows an alternative method of mounting the conductive strips.

Figure 6:
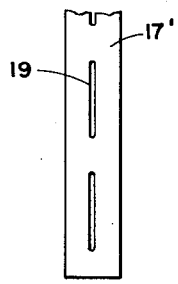

Fig. 6 shows in elevation a portion of an insulator used in the Fig. 5 construction.

Figure 7:
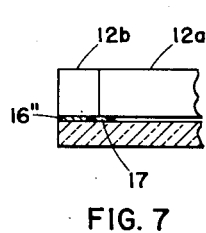

Fig. 7 shows in partial section the end segment of a translucent plate to which conductive strips are affixed using simplified components.

Figure 8:
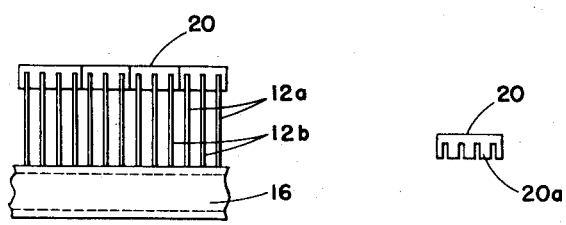

Fig. 8 shows in elevation from one end a portion of the translucent plate and conductive strip assembly illustrating one method of separating and spacing the strips.

Figure 9:
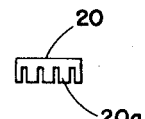

Fig. 9 shows an individual insulator of the type used in the Fig. 8 construction.

Figure 10:
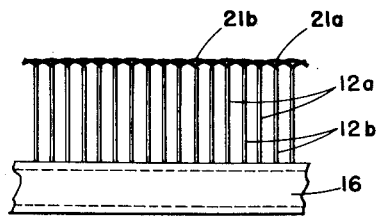

Fig. 10 is an elevational view from one end showing a portion of the assembly with color strips separated from one another by an alternative means.

Fig. 11 shows in perspective a fixture positioned to aid in quickly and accurately assembling the strips relative to the plate.

Figure 1:
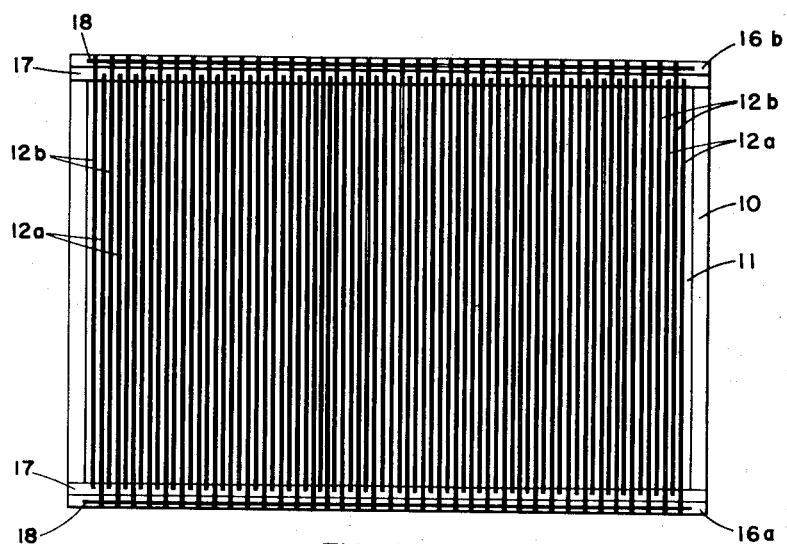
Fig. 1 is an elevational view toward the concave side of the translucent plate with the conductive strips fixed in position.
Figure 2:
Fig. 2 is an elevational view from one end of the assembly shown in Fig. 1.

A complete assembly using our novel arrangement and method of support of the conductive strips upon the translucent plate is illustrated in Figs. 1 and 2. The plate 10 is advantageously curved and composed of glass. While it is not essential that this member either be curved or composed of glass, it is important that it be rigid material and translucent to visible light. Translucent is here used in its broad sense to mean transmitting light either clearly or diffusely. A coating of phosphor 11, or screen, is applied to one surface of the plate 10, preferably the concave side. This phosphor coating 11 should be made thin enough to permit the passage of light therethrough. The purpose of this phosphor coating is to generate one of the primary colors when bombarded by electrons. This color is frequently red, but, as any of the primary colors may be substituted, it is appropriate to refer to the color produced generally as the first color.

Thin conductive strips 12a and 12b are arranged in front of the translucent plate 10 on the phosphor coated side thereof. These strips must be conductive in order to be capable of carrying a positive potential. The faces of each strip are close spaced to the faces of the adjacent strips and one edge of each strip is close spaced to or equidistant from the plate 10 throughout the length of said strip. The faces of each strip are coated with phosphors either of a second primary color or of a third primary color. Strips coated with the phosphor of a second primary color are designated 12a and those coated with a phosphor producing the third primary color are designated 12b. Strips 12a and 12b alternate so that a strip bearing a phosphor producing the second color will always be adjacent to strips bearing the phosphor producing the third color, and vice versa.

Figure 3:
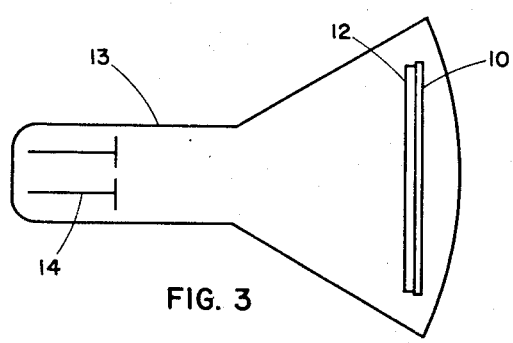
Fig. 3 shows schematically the location of the translucent plate and conductive strip assembly in a cathode ray tube, this diagrammatic representation of the plate showing it as lying in a plane instead of being concave as shown in Fig. 2.

The location of an assembly similar to those of Figs. 1 and 2 in the color television tube is illustrated in Fig. 3. This tube may be a conventional cathode ray tube similar to kinescopes commonly used in the black and white television art. Within the vacuum envelope 13 is an electron gun 14 which produces a stream of electrons. This electron beam is made to scan plate 10. Plate 10 is so located within the vacuum envelope 13 that its phosphor coated surface 11 may be conveniently scanned by the electron beam. The strips are always arranged so that the lengthwise elements of each strip are parallel to the lengthwise elements of every other strip. The strips are also arranged so that scanned lines cross the strips at right angles. It is further desirable to arrange the strips so that their faces lie approximately parallel to the electron beam at all points. By so arranging the strips the amount of blocking or interception of the beam by said strips will be minimized. Such interception of the beam is undesirable because it produces a dark line in the picture. Thus, in most instances it is expedient to arrange the strips radially so that the center from which they radiate is approximately coincident with the virtual center of deflection of the electron beam. With such an arrangement it is usually desirable to employ a plate which is a cylindrical segment whose axis passes through the virtual center of deflection approximately perpendicular to the plane of scanning. If this is done conventional focusing and deflection means may be used. It is possible, however, to adjust the deflection and scanning of the electron beam in such a way that other arrangements of plates are possible. Thus it is possible to arrange the strips parallel to each other along a planar plate as shown in Fig. 3 as well as along the curved surfaces shown in Figs. 1 and 2.

As the electron beam scans the phosphor coating 11 of plate 10, it must pass between successive adjacent pairs of strips 12a and 12b. If the strips both have the same voltage applied to them, so that a uniform field is presented to the electron, it will not deviate from the straight line path to the phosphor surface 11. If, however, the positive bias on the adjacent strip 12a is increased the negative electrons will be deflected from their straight path and tend to bombard the phosphor covered surface of this strip thereby producing the second color. On the other hand, should the positive bias on the strip 12b be increased, the electron beam will be deflected to this strip so that the third color will be produced. The second and third colors can be seen through the phosphor coating 11 because this coating is made thin enough to transmit light. Alternate strips are connected together electrically so that the same potential may be applied to all plates bearing the same color phosphor. Thus it is possible to make successive scannings in red, blue and green by merely changing the bias on the metallic strips and retaining one of the three bias combinations previously alluded to for each of the separate scannings. The eye is capable of mixing these three primary color pictures together so as to obtain a picture wherein all colors may be seen.

Referring to Fig. 4, metallic support members 16 are affixed at opposite edges of the plate 10. The support members need not be U-shaped as shown but they are advantageously of some shape which will fit over or adhere to the ends of plate 10. While it is possible to mount the support members elsewhere, the advantage of mounting them along the edges of plate 10 is immediately apparent. Where the plate 10 is curved, the support members to fit the edges must be curved as shown in Fig. 2. These support members have a generally planar mounting surface which parallels the screen surface of the plate, to which mounting surface the strips are affixed. As seen in Fig. 4 the strips 12 are preferably affixed at only one edge of the plate and are arranged so that they are out of contact with the support member adjacent their unattached end. Thus one end of strips 12a are all attached at one edge to support member 16a and one end of strips 12b are all attached at the opposite edge to second support member 16b. The strips are affixed generally perpendicular to the planar surface of the conductor support member. In order to prevent the strips from contacting the phosphor coated surface of plate 10, and in order to help maintain uniform spacing between the edges of the strips adjacent plate 10 and the surface of said plate, insulators 17 are employed. These insulators are advantageously placed adjacent the support members and are made the same thickness as the adjacent portion of the support member. It will be noted that by our invention the support members 16a and 16b serve the dual function of mechanical support and electrical connection. Thus voltages applied to support 16a will appear on all the strips 12a and voltage applied to support 16b will appear on all the strips 12b. In addition, the fact that one end of each strip is unattached prevents buckling of the strips under conditions of differential expansion with consequent shorting thereof or, at least, a change in the spacing therebetween.

Plates 12 may be affixed to support member 16 by any appropriate means such as welding or brazing. One convenient arrangement for welding is shown in Fig. 4. In this arrangement a wire 18 is welded atop the support member 16 so that it runs essentially parallel to the edge of plate 10. The strips are held in place with one edge atop this member and welding electrodes are placed one on the strip and one on the support. The wire 18 forms a point of high resistance at which the weld may occur, and it also supplies needed filler material for completing the weld.

A variation in the type of insulator used is shown in Figs. 5 and 6. In this instance the insulator 17' is placed atop the support member 16'. Perforations 19 are formed in the insulator in which the wire 18 used in welding may be placed to be affixed to a support 16. In this manner the insulator 17' is held in place by the weld between the wire 18, and the support member 16'. The strips 12a and 12b may then be welded in place as previously described. The insulator offers an insulated surface as in the Fig. 4 construction upon which the unattached ends of alternate plates may ride without the additional requirement of attaching the insulator to the plate 10.

The unattached ends of the metallic strips may vary in shape as shown in Figs. 4 and 5. In each instance, however, this end is shaped so that it may rest upon insulator 17 without contacting support member 16.

Because of the length of the metallic strips, attaching them to a support at only one end of the plate 10 leaves them somewhat free to move in response to mechanical and gravitational forces, thereby changing the spacings therebetween and even possibly causing a short therebetween. Figs. 8 and 9 illustrate one convenient means of preventing such undesirable movement of the strips. A series of comblike insulators 20 have their teeth 20a introduced between adjacent strips. Several rows of these insulators may be used at various distributed points between the support members 16a and 16b in order to obtain better mechanical stability.

An alternative means of maintaining the spacing between the strips is shown in Fig. 10. In this instance wires 21a and 21b, of sufficient rigidity to hold the metallic strips in their correct positions relative to one another, are used. Wire 21a may be spot welded to strips 12a and wire 21b may be similarly spot welded to strips 12b. This method involves the exercise of great care in looping these wires over alternate strips to prevent shorting between each wire 21 and those strips to which it is not affixed. On the other hand, the wires are fixed in place so that they cannot loosen and be knocked out by mechanical shocks as can the dielectric comb insulators 20.

In order to obtain a picture in color, it is necessary to use a great many metallic strips. It is possible to obtain a picture with as few as 150 strips, but the quality of such a picture is extremely poor. For definition satisfactory for commercial color television, there should be in excess of 400 strips. Obviously then, the spacing between the strips and the thickness of the strips themselves have been much exaggerated in our drawings for the sake of clarity. When spacings between strips are required to be in the order of 0.025 inch, measuring center to center on the strips, and when strip thicknesses are required to be in the order of 0.005 inch, some of the manufacturing problems encountered become more vivid. Especially difficult is the assembly of the metallic strips in their correct position relative to one another and relative to the plate 10. However, we have devised a means to accomplish this assembly of strips 12a and 12b quickly and accurately.

Fig. 11 illustrates in perspective and partially broken away a plate 10 and its strips 12a and 12b partially assembled and held in place by a fixture which we use for the purpose of assembling strips. The fixture includes two large insulators 23 which conform in shape to the surface of the plate 10. Each insulator 23 has slots 23a cut in one edge in order to snugly accommodate the ends of the strips 12a or 12b respectively. These slots 23a are formed in the insulators 23 with great precision so that when the ends of the strips are placed therein, the strips are located precisely in the required position relative to one another. The correct positioning of strips 12a relative to strips 12b is assured by the use of rods 24 which penetrate each of the insulators 23. Each insulator 23 may be held in place by a nut 25 or similar means causing it to bear against shoulders formed by a reduction in diameter of the rods 23. The whole fixture may be held in correct position relative to plate 10 by means of conventional clamps or similar means (not shown). The fixture is in correct position when each strip inserted into a slot 23a is supported in its proper position relative to the plate 10. It is often convenient to place the comblike spacers 20 between the strips as shown during assembly. When the whole assembly is completed, one welding electrode may be affixed to support member 16. Another welding electrode may be placed atop the edge of a strip remote from the plate 10 above the support member 16. As current is passed through the assembly a weld will occur at the point of high resistance offered by the wire 18. Each strip is advantageously welded to its respective support in this way prior to the removal of the fixture, thus assuring great accuracy in the assembly.

We claim:

1. A color television tube having mounted therein a translucent plate which is provided with a phosphor coated surface, two electrically conductive members affixed to and extending along opposite edges of the plate, each conductive member having a generally planar surface which is provided with a phosphor coated surface, two electrically conductive members affixed to and extending along opposite edges of the plate, each conductive member having a generally planar surface which parallels the plate, a plurality of thin phosphor coated strips arranged generally parallel to each other and generally transverse to the surface of the plate with alternate strips affixed to and held generally perpendicular to and in good contact at their ends with the planar surface of one of said conductive members such that each strip is out of contact with the phosphor coated surface of the translucent plate.

2. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, and conductive support members mounted at opposite edges of the translucent plate and extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member.

3. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, conductive support members mounted at opposite edges of the translucent plate and extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, means adjacent the conductive support members insulatingly supporting the unattached end of each of the strips out of contact with the adjacent conductive support member.

4. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips and conductive support members mounted at opposite edges of the translucent plate extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, the unattached end of each strip being supported out of contact with the support member adjacent said unattached end on an insulator member which lies beside said support member and which provides a support at the same height above the plate as the support member.

5. In a color television tube, a plate of translucent material having one of its faces covered with a phosphor of a first color and so positioned that it will be scanned by an electron beam, a plurality of thin conductive strips, so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, conductive support members mounted at the opposite edges of the translucent plate and extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, the unattached end of each strip resting on an insulator atop the support member at that end such that that insulator lies between the strip and the support member.

6. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, conductive support members mounted at opposite edges of the translucent plate and extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, the unattached end of each strip being supported out of contact with the support member adjacent said unattached end on an insulator adjacent the conductive support member, and comblike insulators so arranged that the teeth of the combs lie between each adjacent pair of strips.

7. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, conductive support members mounted at opposite edges of the translucent plate and extending along said edges, each conductive support member having a generally planar surface which parallels the plate, the strips of the second color being conductively affixed at one end generally perpendicular to the planar surface of one support means and the strips of the third color being conductively affixed at the opposite end generally perpendicular to the planar surface of the other support means, the unattached end of each strip being supported out of contact with the support member adjacent said unattached end by an insulator adjacent the conductive support member, and insulation members arranged between the strips to keep the strips correctly spaced and out of contact with one another.

8. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip, and one edge of each strip is close spaced to and equidistant from the translucent plate throughout the length of said strip, phosphor of a second color applied to alternate strips and phosphor of a third color applied to the other strips, conductive support members mounted at opposite edge of the image plate and extending along said edges, each conductor support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, the unattached end of each strip being supported out of contact with the support member adjacent said unattached end by an insulator adjacent the conductive support member, and wire support and separation members affixed to strips of the same color without contacting strips of another color.

9. In a color television tube, a plate of translucent material having one of its faces covered with a phosphor of a first color and so positioned that it will be scanned by an electron beam, a plurality of thin conductive strips so arranged that the faces of each strip are close spaced to the faces of adjacent strips, lengthwise elements of each strip are parallel to lengthwise elements of every other strip and one edge of each strip is close spaced to and equidistant from the translucent plate throughout the length of said strip, phosphor of a second color applied to alternate strips and phosphor of a third color applied to the other strips, conductive support members mounted at opposite edges of the translucent plate and extending along said edges, each conductive support member having a generally planar surface which parallels the plate, the strips of the second color being conductively affixed at one end generally perpendicular to the planar surface of one support member and the strips of the third color being conductively affixed at the opposite end generally perpendicular to the planar surface of the other support member, at both ends a wire member sandwiched between the support member and the strips affixed thereto, said wire providing points of high resistance which permit welding and acting as a filler for the welds.

References Cited in the file of this patent

UNITED STATES PATENTS

| | | |
|---|---|---|
| 1,065,685 | Hibbard | June 24, 1913 |
| 1,858,656 | Batherman | May 17, 1932 |
| 2,518,200 | Sziklai | Aug. 8, 1950 |
| 2,529,485 | Chew | Nov. 14, 1950 |
| 2,542,262 | Richardson | Feb. 20, 1951 |
| 2,571,991 | Snyder | Oct. 16, 1951 |
| 2,579,705 | Schroeder | Dec. 25, 1951 |
| 2,599,352 | Schroeder | June 3, 1952 |
| 2,611,100 | Faulkner et al. | Sept. 16, 1952 |
| 2,614,231 | Lawrence | Oct. 14, 1952 |
| 2,635,201 | Rajchman | Apr. 14, 1953 |